United States Patent [19]
Rees

[11] 3,807,915
[45] Apr. 30, 1974

[54] UNLOADING MECHANISM FOR INJECTION-MOLDING MACHINE

[75] Inventor: Herbert Rees, Toronto, Ontario, Canada

[73] Assignee: Husky Manufacturing & Tool Works Ltd., Bolton, Canada

[22] Filed: Oct. 26, 1972

[21] Appl. No.: 300,883

[52] U.S. Cl. ............................ 425/436 R, 425/444
[51] Int. Cl. ................................................ B29f 1/14
[58] Field of Search......... 425/436 R, 436 RM, 444, 425/422, 450, DIG. 222; 249/68

[56] References Cited
UNITED STATES PATENTS

| | | | |
|---|---|---|---|
| 2,711,567 | 6/1955 | Knapp | 425/DIG. 222 |
| 2,556,818 | 6/1951 | Menzel | 425/436 X |
| 3,700,375 | 10/1972 | Rees | 425/422 |

Primary Examiner—J. Spencer Overholser
Assistant Examiner—David S. Safran
Attorney, Agent, or Firm—Karl F. Ross; Herbert Dubno

[57] ABSTRACT

A fixed frame portion of an injection-molding machine carrier behind its movable platen a crank to which, at points approximately equispaced from its fulcrum, a pair of arms are articulated. One of these arms is pivoted to the movable platen whereas the other one is pivoted to a carrier connected with a set of ejector pins or a stripper plate. The spacing of the points of articulation of the two arms on the crank is so chosen that the separation of these points in the direction of platen motion is relatively wide in one limiting position and relatively narrow in the other limiting position of platen reciprocation whereby the carrier is thrust forward with reference to the platen as the latter is retracted.

8 Claims, 6 Drawing Figures

UNLOADING MECHANISM FOR INJECTION-MOLDING MACHINE

My present invention relates to a mechanism for unloading one or more mold cavities of an injection-molding machine, i.e., for discharging the molded articles from these cavities after the mold is opened.

Generally, such unloading operations can be carried out with the aid of either a stripper plate, interposed between the two relatively movable mold portions defining the cavity or cavities, or a set of ejector pins (at least one per cavity) which traverse one of the mold portions and may be interconnected beyond the latter by a common plate or the like.

In my copending application Ser. No. 115,207, filed 16 February 1971, now U.S. Pat. No. 3,726,625, I have disclosed a mechanism of the second type wherein an articulated linkage on a movable platen, carrying one of the halves of a split mold, connects this platen with an ejector plate in such a manner that the plate performs a harmonic unloading motion, progressively accelerating from standstill, whenever a push member coupled with that linkage strikes a fixed abutment during the terminal phase of a mold-opening stroke.

In another copending application, Ser. No. 161,845, filed 12 July 1971, now U.S. Pat. No. 3,767,352, an articulated linkage is joined to the two relatively movable mold portions (either directly or through their supporting platens) to actuate either an externally positioned ejector plate or a stripper plate sandwiched between the relatively movable mold portions in response to a displacement of these mold portions into the open-mold position.

The general object of my prevent invention is to provide an unloading mechanism which eliminates the need for disposing a relatively complex linkage in the space between the movable platen and a fixed frame portion to the rear thereof, as in application Ser. No. 115,207, and also avoids the necessity for a connection with the stationary mold portion or its platen, as per application Ser. No. 161,845.

A more specific object is to provide a mechanism of this character in which the actuation of the unloading means is more gradual than would be the case with direct transmission of the platen speed to such unloading means in accordance with conventional practice.

These objects are realized, in accordance with my present invention, by the provision of one or more cranks connected with a stationary rear member of the machine frame at a fixed fulcrum so as to be swingable in a plane parallel to the direction of reciprocation of the movable platen. A pair of links are articulated to that crank at two points offset from its fulcrum and separated by a fixed distance. The first of these links is connected with the movable platen so as to swing the crank as the platen reciprocates, the mutual spacing of these points in the direction of reciprocation being relatively great in one limiting position of the platen stroke and relatively small in the other limiting position thereof. The second link is connected to the unloading means movably carried on the platen, such as the aforedescribed ejector pins or stripper plate; this connection advantageously includes a carrier plate or the like which is slidably mounted on the movable platen and is pivoted to that second arm. If necessary, a lost-motion coupling may be inserted between that carrier and the unloading means proper to hold the latter stationary with reference to the movable platen during an initial phase of the mold-opening stroke in which the separation of the points of articulation in the direction of platen motion changes but slightly. The carrier may be guided on the usual tie rods or may be traversed by studs extending rearwardly from the movable platen.

The crank may be provided with means, such as one or more additional mounting holes, for varying the position of the point of articulation of either or both links either continuously or in steps.

The above and other features of my invention will now be described in detail with reference to the accompanying drawing in which.

Figure 1:
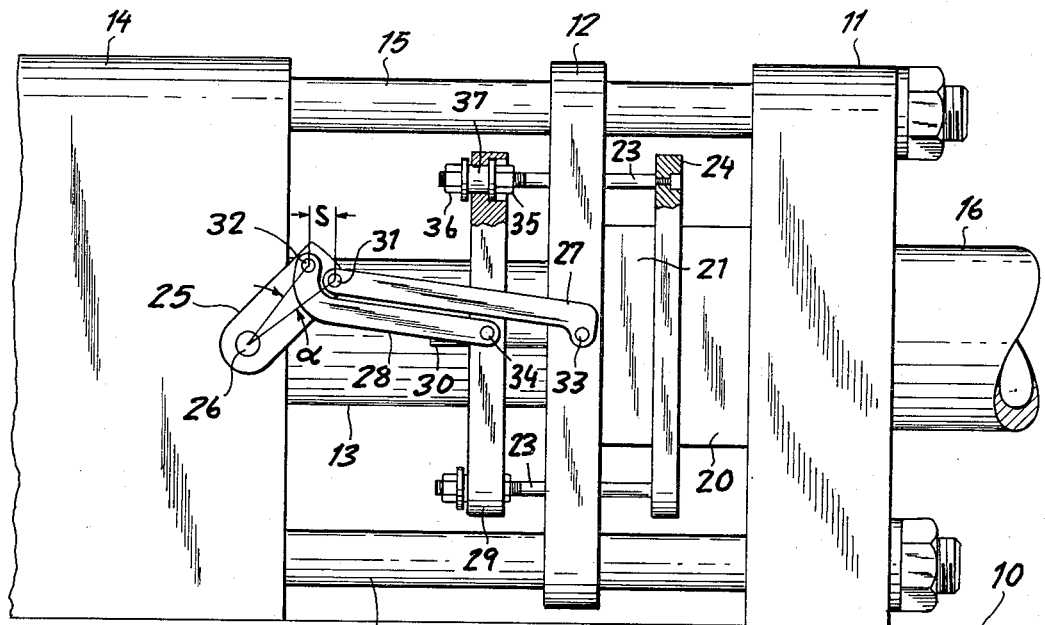
FIG. 1 is a side-elevational view of a portion of an otherwise conventional ejection-molding machine incorporating my improved unloading mechanism, shown in a position of mold closure.
Figure 2:
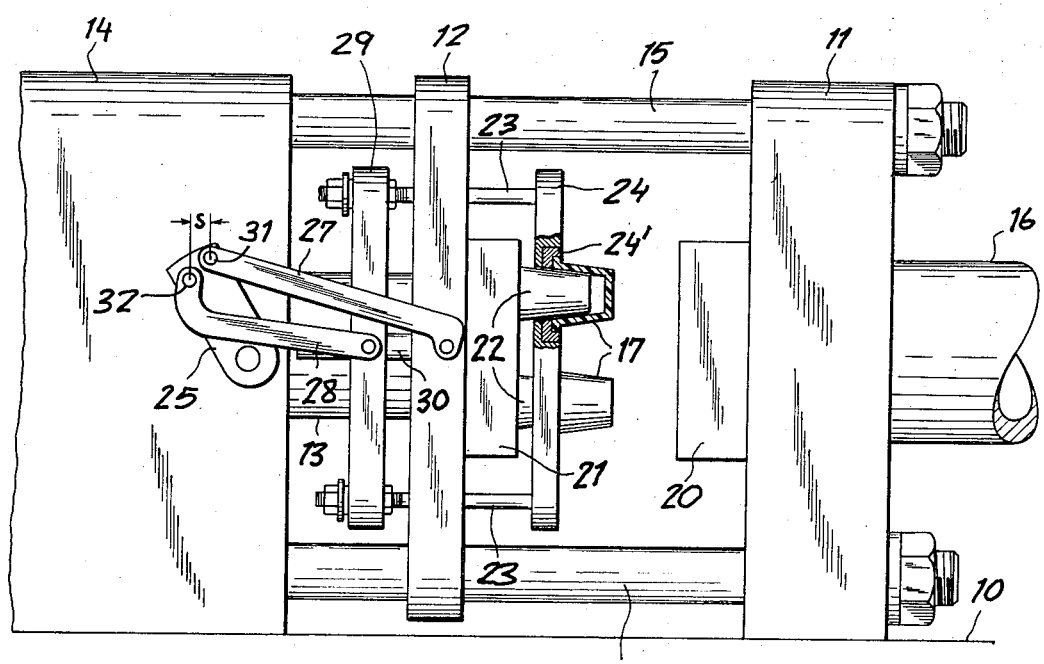
FIG. 2 is a view similar to FIG. 1 but showing the mechanism with the mold open.
Figure 3:
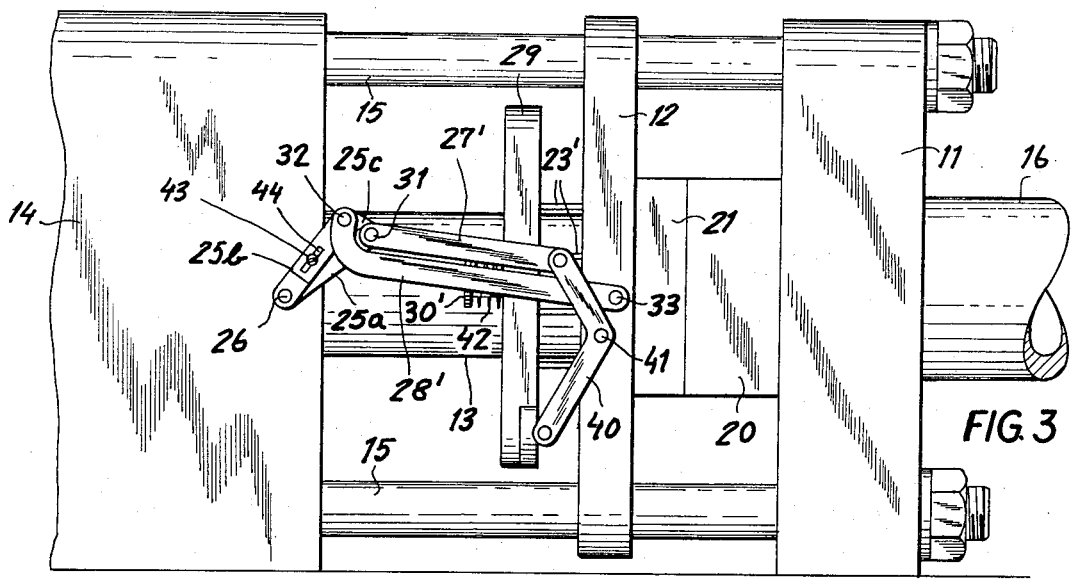
Figure 4:
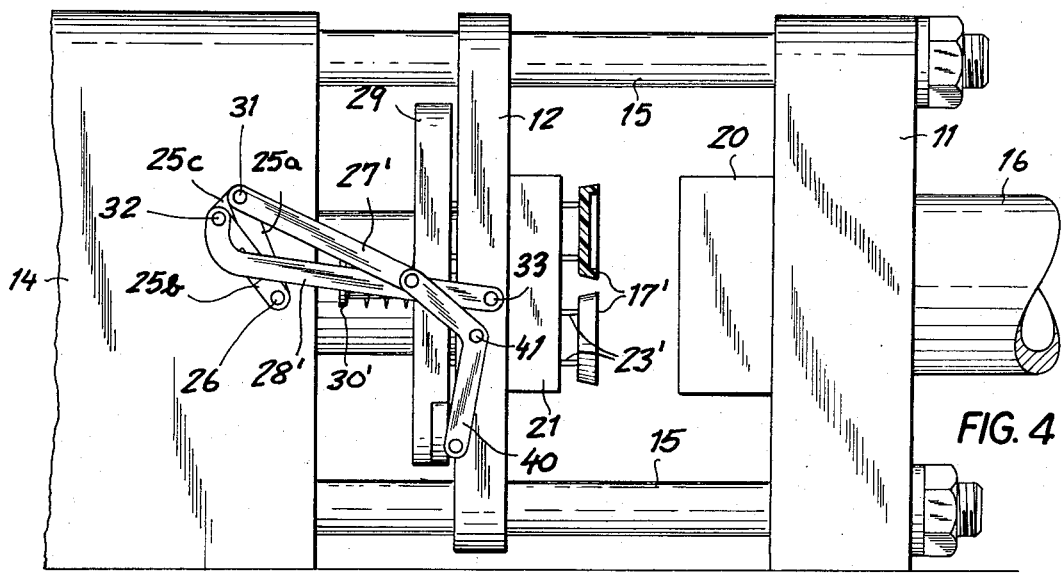
Figure 5:
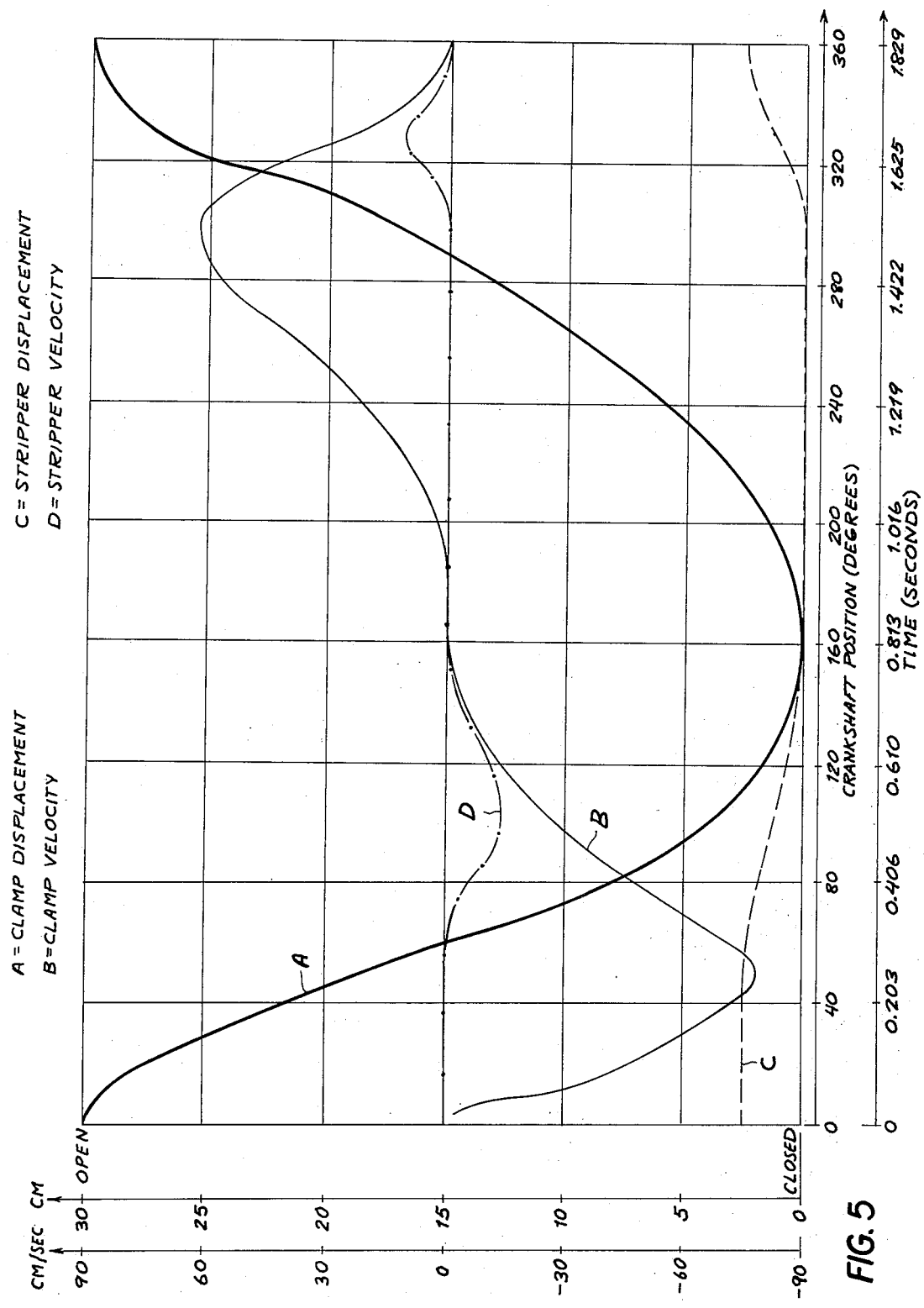

FIGS. 3 and 4 are fragmentary views respectively similar to FIGS. 1 and 2 but illustrating a modification; and FIG. 5 is a curve diagram relating to the operation of FIGS. 1 and 2.

An injection-molding machine according to the invention, partly illustrated in FIGS. 1 and 2, comprises a fixed platen 11 rising from a horizontal bed 10 and a movable platen 12 slidable, under the control of a reciprocating ram 13, on a set of four tie bars 15 (only two shown). Bed 10 is rigid with a stationary frame member 14 in which the ram 13 is guided and to which the tie bars 15 are secured at one end, the opposite ends of these tie bars being anchored to the fixed platen 11. The latter adjoins the end of a cylinder 16 wherein an injection piston (not shown) is reciprocated in timed relationship with the ram 13 to inject liquefied plastic material through one or more orifices into a corresponding number of nonillustrated recesses in a stationary mold portion 20 mounted on the platen 11. A movable mold portion 21 carries a set of cores 22 fitting into respective recesses of mold portion 20 to define therewith a number of mold cavities designed, in this specific embodiment, for the molding of drinking cups 17.

A set of, say, four guide pins 23 (only two shown) support a stripper plate 24 which extends at right angles to The mold axis, between the mold halves 20 and 21, and is limited axially slidable with reference to mold half 21 together with the pins 23 which traverse the platen 12. Plate 24 is apertured for the passage of mold cores 22 and is provided with annular inserts 24' (FIG. 2) which in the closed-mold position of FIG. 1 define parts of the several mold cavities; these inserts form a seat for the rims of the cup-shaped articles 17 which are thus lifted off their cores 22 when the plate 24 is moved to the right with reference to mold portion 21 as illustrated in FIG. 2.

A crank 25 is mounted on frame member 14 for swinging in a vertical plane about a fixed fulcrum 26. The crank is linked by an arm 27 with the platen 12 and by another arm 28 with a carrier plate 29 which is disposed parallel to platen 12 between the latter and frame member 14. Plate 29 is guided by a pair of studs 30 (only one shown) on opposite sides of the ram 13 which traverses that plate with clearance. Arms 27 and 28 are articulated to the crank 25 by two pins 31, 32 which are nearly equidistant from fulcrum 26, pin 32 lying a little closer to that fulcrum. The opposite ends of the arms are pivoted to the platen 12 and the carrier plate 29 by respective pins 33, 34.

As shown in FIG. 1, the guide pins 23 for stripper plate 24 are mounted on carrier plate 29 with a certain amount of play established by a pair of nuts 35, 36 which are threaded onto the left-hand ends of these pins with interposition of a sleeve 37. This provides a lost-motion coupling between the plates 29 and 24 so that minor shifts in the relative spacing of plate 29 and platen 12 do not affect the position of plate 24. The latter, if desired, may be spring-urged toward the platen 12 so as to remain in contact with mold portion 21 unless positively separated therefrom by the thrust of pins 23.

Figure 1A:
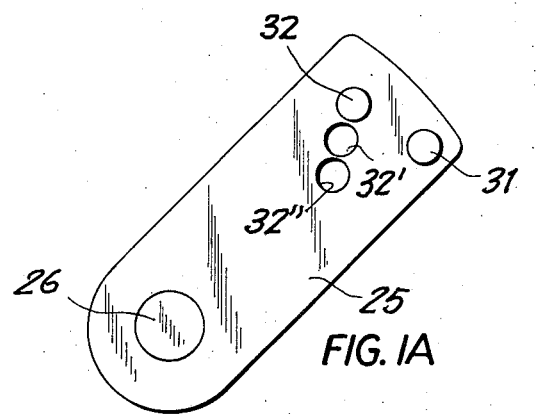
FIG. 1A is a view of a detail of the mechanism shown in FIG. 1.

Between the mold-closed position of FIG. 1 and the mold-open position of FIG. 2, crank 25 swings through an angle advantageously ranging between about 60° and 90°. FIG. 1A has holes 32', 32" in crank 25 providing alternate positions for pin 32 to vary the unloading stroke of stripper plate 24.

In the position of FIG. 1, the separation S of pins 31 and 32 in the direction of platen reciprocation (i.e., parallel to the mold axis) is relatively large, compared with the corresponding separation s in the position of FIG. 2. This arrangement results in a foreshortening of the stroke of carrier plate 29 relative to that of platen 12, bringing about the desired relative displacement of stripper plate 24 toward the end of the withdrawal stroke of the platen. The angular separation $\alpha$ of pins 31 and 32 is relatively small and ought not to exceed an arc of about 30°.

Reference in this connection is made to FIG. 5 which shows several curves A, B, C and D relating to a system as shown in FIGS. 1 and 2. Solid curves A (heavy) and B (light) represent clamp displacement and clamp velocity, respectively, the term "clamp" denoting the movable assembly 12, 13, 21. The broken lines C (dashed) and D (dot-dashed) respectively indicate stripper displacement and stripper velocity, i.e., the law of motion of plate 24 relative to the clamp. These curves have been plotted for a full cycle of 360° of the crankshaft driving the reciprocating ram 13 (cf. my prior U.S. Pat. No. 3,117,348); the abscissa also shows the time elapsed at different stages of the cycle (total period 1.829 sec) whereas the ordinate shows displacement in centimeters (ram stroke 30 cm) and velocity in cm/sec (range limits approximately ±90 cm/sec for the clamp and ±12 cm/sec for the stripper plate). From curves C and D it will be noted that stripper plate 24 remains substantially fixed, with reference to mold portion 21, for major parts of both the opening and the closing stroke. The peaks of the curves follow a substantially Gaussian law.

In FIGS. 3 and 4 I have shown a modification of the system of FIGS. 1 and 2 wherein the solid crank 25 has been replaced by a triangular linkage 25a, 25b, 25c, with pins 31 and 32 respectively carried on the junction of the short leg 25c with the two longer legs 25a and 25b. The more forwardly located pin 31 is here connected via an arm 27' with a bell-crank lever 40 pivoted at 41 to platen 12; the free end of this bell-crank lever bears from the right (i.e., from the direction of platen 12) upon the carrier plate 29 against the force of a spring 42 on each stud 30' biasing the plate 29 toward the platen. The other, longer arm 28', engaged by pin 32, is pivoted at 33 directly to the platen 12. One of the legs 25a, 25b could be made adjustable in length to vary the location of pin 31 or 32 as described with reference to FIG. 1A; thus, leg 25b has been shown split into two relatively slidable sections held together by a screw 43 passing through a slot 44.

It will be noted that the arrangement of FIGS. 3 and 4 operates essentially in the same manner as the previous one, with plate 29 moved back from platen 12 in the closed-mold position (FIG. 3) and approaching that platen toward the end of the mold-opening stroke. Lever 40 could also be positively connected with platen 12, with lost motion if necessary (e.g. by a pin on the platen entering a slot on the lever), to obviate the need for spring 42.

By way of further modification, stripper plate 24 of FIGS. 1 and 2 has been replaced in FIGS. 3 and 4 by a set of ejector pins 23' traversing the platen 12 and the mold portion 21 from which they project in the position of FIG. 4 to dislodge a molded article 17' (e.g. a cup lid). The pins 23' could be mounted on carrier plate 29 with a lost-motion coupling similar to that shown in FIG. 1 for the guide pins 23.

The linkages 25, 27, 28 of FIGS. 1 and 2 or 25a, 25b, 25c, 27', 28, 40 of FIGS. 3 and 4 are symmetrically duplicated on the opposite side of the machine frame.

I claim:

1. In an injection machine, in combination:
   a frame provided with a stationary rear member;
   a platen linearly reciprocable on said frame between a forward position remote from said member and a retracted position proximal to said rear member;
   a first mold portion on said platen engaging a second mold portion on said frame in said forward position to define therewith at least one mold cavity;
   unloading means on said platen movable with reference thereto for disloding an article molded in said cavity;
   crank means connected with said member at a fixed fulcrum for swinging in a plane parallel to the direction of reciprocation of said platen;
   a first link connected with said platen and articulated to said crank means at a first point offset from said fulcrum; and
   a second link connected to said unloading means and articulated to said crank means at a second point offset from said fulcrum and separated from said first point by a fixed distance, the mutual spacing of said points in the direction of reciprocation being relatively great in one of said positions and relatively small in the other of said positions of said platen with consequent relative movement of said unloading means to dislodge said molded article upon withdrawal of said first mold portion from said second mold portion.

2. The combination defined in claim 1 wherein said first point lies closer to said platen at least in said forward position whereby said unloading means is shifted forwardly on said platen upon withdrawal thereof to said retracted position.

3. The combination defined in claim 1 wherein said points are spaced apart by an arc of not more than 30°.

4. The combination defined in claim 3 wherein said crank means is dimensioned to swing upon reciprocation of said platen through an angle ranging between substantially 60° and 90°.

5. The combination defined in claim 1 wherein the connection between said second link and said unloading means includes a carrier slidably mounted on said platen and pivoted to said second link.

6. The combination defined in claim 5 wherein said connection includes a lost-motion coupling between said carrier and said unloading means.

7. The combination defined in claim 1, further comprising adjustment means for varying the position of one of said points on said crank means.

8. The combination defined in claim 1, further comprising stud means on said platen traversing said carrier.

* * * * *